United States Patent
Liu

(10) Patent No.: US 10,441,012 B2
(45) Date of Patent: Oct. 15, 2019

(54) STRIP OF MATERIAL AND METHOD FOR PROTECTING AN EDGE OF A GARMENT

(71) Applicant: Regina Miracle International (Group) Limited, Kwai Chung (HK)

(72) Inventor: Zhenqiang Liu, Kwai Chung (HK)

(73) Assignee: REGINA MIRACLE INTERNATIONAL (GROUP) LIMITED, Hong Kong (HK)

(*) Notice: Subject to any disclaimer, the term of this patent is extended or adjusted under 35 U.S.C. 154(b) by 106 days.

(21) Appl. No.: 15/848,167

(22) Filed: Dec. 20, 2017

(65) Prior Publication Data

US 2018/0168257 A1    Jun. 21, 2018

(30) Foreign Application Priority Data

Dec. 20, 2016 (CN) .......................... 2016 1 1183370

(51) Int. Cl.
*A41D 27/14* (2006.01)
*A41D 27/24* (2006.01)
(Continued)

(52) U.S. Cl.
CPC ............. *A41D 27/24* (2013.01); *A41D 27/14* (2013.01); *B29C 65/62* (2013.01); *B29C 66/43* (2013.01); *A41D 2300/50* (2013.01)

(58) Field of Classification Search
CPC .............. B29C 65/5057; B29C 66/135; B29C 65/4815; B29C 65/4825; B29C 65/485;
(Continued)

(56) References Cited

U.S. PATENT DOCUMENTS 2,001,693 A * 5/1935 Rockwood ............. A43B 15/00
156/201
2,073,231 A * 3/1937 Siegel ...................... A41D 3/02
2/97
(Continued)

FOREIGN PATENT DOCUMENTS

CN    203182089 U    9/2013
CN    104522920 A    4/2015

OTHER PUBLICATIONS

Chinese Office Action, dated Mar. 6, 2019 issued in corresponding Chinese Patent Application No. 201611183370.9. Includes English translation. Total 15 pages.

*Primary Examiner* — Robert H Muromoto, Jr.
(74) *Attorney, Agent, or Firm* — Ostrolenk Faber LLP

(57) ABSTRACT

A strip of material and a method for protecting an edge of garment are A main body having two opposite longitudinal sides; a first extension extending from one of the longitudinal sides of the main body; and a second extension extending from the same longitudinal side of the main body, the first extension and the second extension being strip-like articles parallel to the longitudinal, the first extension having a first side facing the second extension and a second side opposite the first side, the first extension being adapted to attach to at least a portion of an edge of the garment but not covering the at least a portion of the edge at least on the second side, the second extension being suitable for covering at least a portion of the first side of the first extension, the at least a portion of the edge and the edge region of the garment.

22 Claims, 10 Drawing Sheets

(51) Int. Cl.
*B29C 65/00* (2006.01)
*B29C 65/62* (2006.01)
*A41D 27/00* (2006.01)

(58) Field of Classification Search
CPC ............ B29C 65/5021; B29C 65/5028; B29C 65/5042; B29C 65/5071; B29C 66/112; B29C 66/1122; B29C 66/43; B29C 66/472; B29C 66/729; B29C 66/0324; A41C 3/12; A41C 1/12; A41D 27/24; A41D 31/02; A41D 27/145; A41D 27/08; A41D 27/14
See application file for complete search history.

(56) References Cited

U.S. PATENT DOCUMENTS

| | | | | | |
|---|---|---|---|---|---|
| 2,570,498 | A * | 10/1951 | Senderowitz | | A41B 9/02 2/234 |
| 3,064,269 | A * | 11/1962 | Scheitlin | | A41F 9/02 2/221 |
| 3,825,006 | A * | 7/1974 | Ralph | | A41B 13/04 604/398 |
| 4,075,716 | A * | 2/1978 | Collins | | A41D 13/1209 2/114 |
| 4,168,546 | A * | 9/1979 | O'Connor | | A41F 9/00 2/220 |
| 4,288,877 | A * | 9/1981 | Klepfer | | A41B 13/10 2/48 |
| 4,353,760 | A * | 10/1982 | Moertel | | A41H 37/003 112/475.16 |
| 6,592,562 | B2 * | 7/2003 | Menard | | A61F 13/4752 604/385.04 |
| 6,796,876 | B2 * | 9/2004 | Luk | | A41C 3/12 2/267 |
| 6,797,352 | B2 * | 9/2004 | Fowler | | A41D 27/24 428/57 |
| 7,166,012 | B2 * | 1/2007 | Lau | | A41C 5/005 2/267 |
| 7,192,332 | B2 * | 3/2007 | Liu | | A41C 3/0014 450/39 |
| 7,198,540 | B2 * | 4/2007 | Liu | | A41C 3/0014 450/39 |
| 7,258,762 | B2 * | 8/2007 | Fowler | | A41D 27/24 156/308.2 |
| 8,113,909 | B2 * | 2/2012 | Liu | | A41C 3/122 450/41 |
| 8,133,091 | B2 * | 3/2012 | Liu | | A41C 5/005 450/39 |
| 9,828,723 | B2 * | 11/2017 | Cain | | A41C 1/14 |
| 2001/0016721 | A1 * | 8/2001 | Salerno | | A61F 13/4752 604/386 |
| 2003/0138586 | A1 * | 7/2003 | Fowler | | A41D 27/24 428/57 |
| 2004/0142631 | A1 * | 7/2004 | Luk | | A41C 3/12 450/1 |
| 2004/0147203 | A1 * | 7/2004 | Luk | | A41C 3/12 450/39 |
| 2005/0014450 | A1 * | 1/2005 | Luk | | A41C 3/12 450/39 |
| 2005/0022920 | A1 * | 2/2005 | Fowler | | A41D 27/24 156/88 |
| 2008/0078012 | A1 * | 4/2008 | Mario | | A41F 9/02 2/237 |
| 2010/0124869 | A1 * | 5/2010 | Liu | | A41C 3/10 450/39 |
| 2013/0086727 | A1 * | 4/2013 | Williams | | A41D 27/14 2/69 |
| 2014/0143929 | A1 * | 5/2014 | Curran | | A41D 27/14 2/69 |
| 2015/0093537 | A1 * | 4/2015 | Cain | | A41C 1/14 428/95 |
| 2018/0116313 | A1 * | 5/2018 | James | | A41D 17/00 |
| 2018/0168251 | A1 * | 6/2018 | Loveland | | A41B 9/10 |

* cited by examiner

STRIP OF MATERIAL AND METHOD FOR PROTECTING AN EDGE OF A GARMENT

TECHNICAL FIELD

The present invention relates to the field of clothing manufacturing, and in particular to a strip of material and method for protecting edges of garment.

BACKGROUND

Edges of conventional garment products are generally protected by adopting a traditional sewing method such as sewing a folded edge, sewing a bulged strip and the like. On the one hand, the sewn garment edge always has an apparent bulge with a conspicuous thickness at the sewing location, which influences the wearing comfort as well as the external appearance. On the other hand, due to the presence of stitches, the sewn position is poor in tensile strength, poor in resilience and aesthetically unpleasant. In addition, sewing threads may also cause undesirable friction to the skin.

SUMMARY

The present invention aims at providing a strip of material and a method for protecting the edge of a garment, which is used for solving one or more of the above-mentioned technical problems.

According to one aspect, the present invention provides a strip of material for protecting an edge of a garment. The strip of material comprises a main body having two opposite longitudinal sides, a first extension extending from one of the longitudinal sides of the main body, and a second extension extending from the one of the longitudinal sides of the main body. The first extension and the second extension each is a strip that is parallel with and/or co-extensive with the one of the longitudinal sides of the main body. The first extension has a first side facing the second extension and a second side opposite the first side. The first extension is adapted to attach to at least a portion of said edge of the garment, the attachment being such that at least on the second side, the first extension does not overlap the at least a portion of said edge of the garment. The second extension is adapted to overlap at least a portion of the first side of the first extension, the at least a portion of said edge of the garment, and a region of the garment proximal at least a portion of said edge of the garment.

In an exemplary embodiment, a first portion of the second extension is adapted to attach to the at least a portion of the first side of the first extension, and a second portion of the second extension is adapted to attach to said region of the garment proximal at least said portion of said edge of the garment.

In an exemplary embodiment, the second extension is adapted to attach to the at least a portion of the first side of the first extension and said region of the garment proximal at least said portion of said edge of the garment by means of an adhesive.

In an exemplary embodiment, at least on the second side of the first extension, the at least a portion of said edge of the garment abuts and does not overlap an edge of the first extension.

In an exemplary embodiment, the first extension is adapted to attach to the at least a portion of said edge of the garment by non-stitching means.

In an exemplary embodiment, the first extension is adapted to further attach to the at least a portion of said edge of the garment by stitching.

In an exemplary embodiment, the strip of material is elastic.

In an exemplary embodiment, the strip of material comprises rubber.

In an exemplary embodiment, at least one of the first and second extensions is attached to the one of the longitudinal sides of the main body.

In an exemplary embodiment, at least one of the first extension and the second extension is integrally formed with the main body.

In an exemplary embodiment, the main body comprises a plurality of layers of material.

In an exemplary embodiment, the first extension extends from a first layer of material of the main body, and the second extension extends from a second layer of material of the main body.

In an exemplary embodiment, along a direction perpendicular to the one of the longitudinal sides of the main body, the first extension is shorter than the second extension.

In an exemplary embodiment, the garment is one of the following: brassiere, T-shirt, pants, underpants, sportswear and sports top.

According to another aspect, the present invention provides a method for protecting an edge of a garment, comprising the steps of: attaching a first extension of a strip of material to at least a portion of said edge of the garment, wherein the strip of material comprises a main body having two opposite longitudinal sides, and a first extension and a second extension extending from one of the longitudinal sides, the first extension and the second extension each being a strip of material parallel with said one of the longitudinal sides, the first extension having a first side facing the second extension and a second side opposite the first side, wherein the first extension is attached to the at least a portion of said edge of the garment, and, at least on the second side, the first extension does not overlap the at least a portion of said edge of the garment; and attaching a first portion of the second extension to at least a portion of the first side of the first extension, and attaching a second portion of the second extension to a region of the garment proximal at least a portion of said edge of the garment, such that the second extension overlaps the at least a portion of the first side of the first extension, the at least a portion of said edge of the garment, and said region of the garment proximal at least said portion of said edge of the garment.

In an exemplary embodiment, the first extension is attached to the at least a portion of said edge of the garment by non-stitching means.

In an exemplary embodiment, the method further comprises the step of attaching the first extension to the at least a portion of said edge of the garment by stitching prior to the step of attaching the first extension to the at least a portion of said edge of the garment by non-stitching means.

In an exemplary embodiment, at least on the second side of the first extension, the at least a portion of said edge of the garment abuts and does not overlap an edge of the first extension.

In an exemplary embodiment, the strip of material is elastic.

In an exemplary embodiment, at least one of the first extension and the second extension is integrally formed with the main body.

In an exemplary embodiment, at least one of the first and second extensions is attached to the one of the longitudinal sides of the main body.

In an exemplary embodiment, along a direction perpendicular to the one of the longitudinal sides of the main body, the first extension is shorter than the second extension.

In accordance with the strip of material and the method for protecting an edge of a garment of the present invention, the garment's edge has no sewing thread and has reduced thickness, thereby improving the wearer's comfort and the external appearance.

BRIEF DESCRIPTION OF THE DRAWINGS

Other features, objectives and advantages of the present invention will become apparent from a reading of the detailed description of non-limiting embodiments with reference to the following drawings.

DETAILED DESCRIPTION

Figure 1:
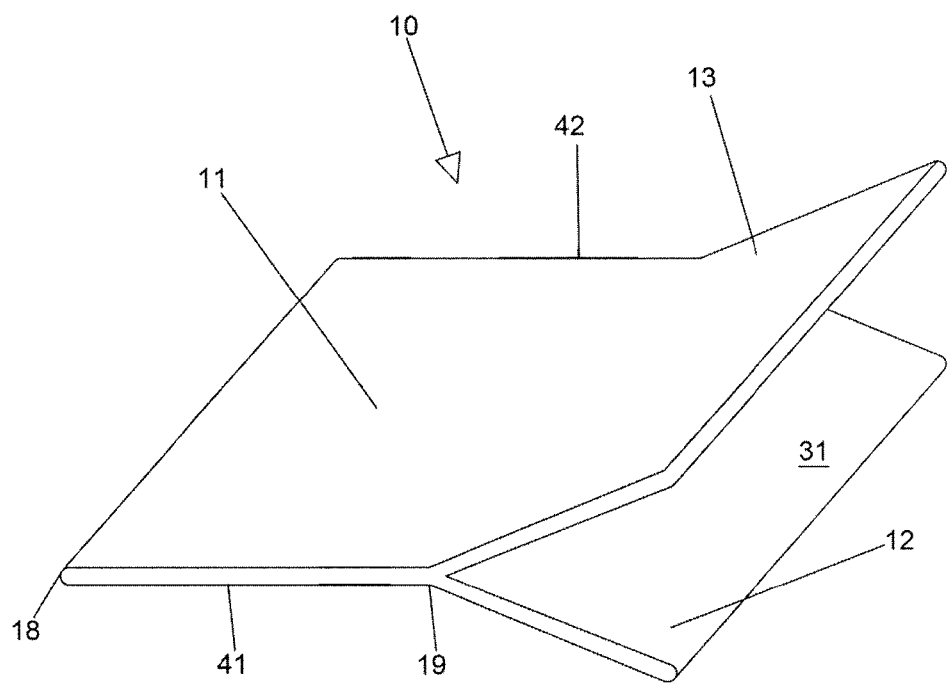
FIG. 1 shows a perspective view of a strip of material according to an exemplary embodiment of the present invention.

The present invention is further described below in combination with the drawings and embodiments. It may be understood that the specific embodiments described herein are only used for explaining the present invention rather than limiting the present invention. In addition, it should be appreciated that in order to facilitate the description, only those parts related to the present invention are illustrated in the drawings.

It should be stated that in case of no conflicts, embodiments in the present invention and features in embodiments can be mutually combined. The present invention is described below in detail with reference to the drawings and in combination with embodiments.

FIG. 1 shows a perspective view of a strip of material according to an exemplary embodiment of the present invention. As shown in FIG. 1, the strip of material 10 includes a main body 11, and a first extension 12 and a second extension 13 separately extending from the same longitudinal side of the main body 11. The main body 11 has two opposite longitudinal sides 18 and 19 and has end portions 41 and 42 intersected with the longitudinal sides 18 and 19. The first extension 12 and the second extension 13 are strip-like extension extending from and co-extensive with the same long edge or side 19 of the strip of material 10 and running parallel to the long edge or side 19. The first extension 12 has a first side or face 31 facing the second extension 13 and a second side or face 32 opposite to the first side or face 31 (referring to FIG. 2A). The first extension 12 is adapted to attach to at least one portion of an edge 15 of the garment 20 and does not cover or overlap the at least one portion of the edge 15 of the garment 20 at least on the second side 32. The second extension 13 is suitable for covering or overlapping at least one portion 17 of the first side 31 of the first extension 12 (referring to FIG. 5B), the at least one portion of the edge 15 of the garment 20 and a region 21 of the garment 20, the region being close to or proximal the at least one portion of the edge 15 of the garment 20 (referring to FIG. 5B). Thus, at least on the second side 32 of the first extension 12, the at least one portion of the edge 15 of the garment 20 is adjoined to or abuts an edge of the first extension 12 and does not cover or overlap the edge of the first extension 12. The longitudinal direction of the strip of material 10, as well as the longitudinal direction of the first and second extensions 12 and 13, run parallel to the garment edge to which the strip of material 10 is to be attached for protecting and covering the garment edge.

In an exemplary embodiment, the first extension 12, the second extension 13 and the long edge or side 19 of the main body 11 are parallel to the at least a portion of said edge of the garment. At least one of the first extension 12 and the second extension 13 may be made of a material same as or different from that of the main body 11 and/or may have the same or different colors as those of the main body 11. In an exemplary embodiment, the thickness of the main body 11 is basically equal to the sum of the thickness of the first extension 12 and the thickness of the second extension 13.

FIG. 1 shows the form of a strip 10 of the present invention before the strip is attached to an edge of a garment to protect and cover the edge. The strip 10 is generally longitudinal in shape having two longitudinal ends 41 and 42, and comprises a main body 11 having two longitudinal sides 18 and 19. First extension 12 and second extension, which themselves are also longitudinal in shape, each extends from the same longitudinal side of the strip 10, so that a generally Y shape is formed when viewed from the lateral side. The Y shape is illustrated in FIG. 2A or 2B, which shows a cross sectional view of the strip.

Figure 2A:
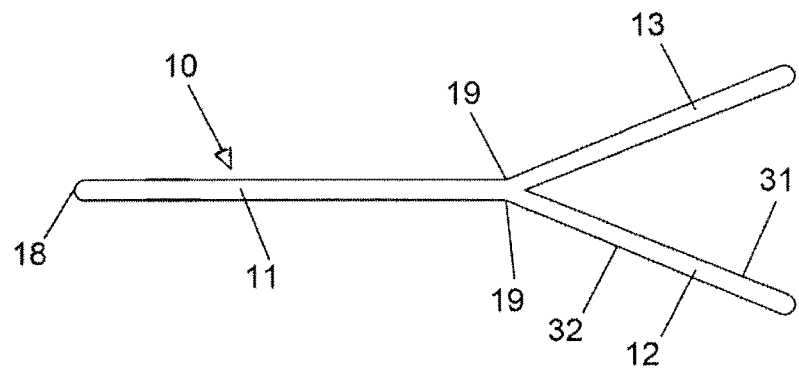
FIG. 2A shows a sectional view of a strip of material according to an exemplary embodiment of the present invention.
Figure 2B:
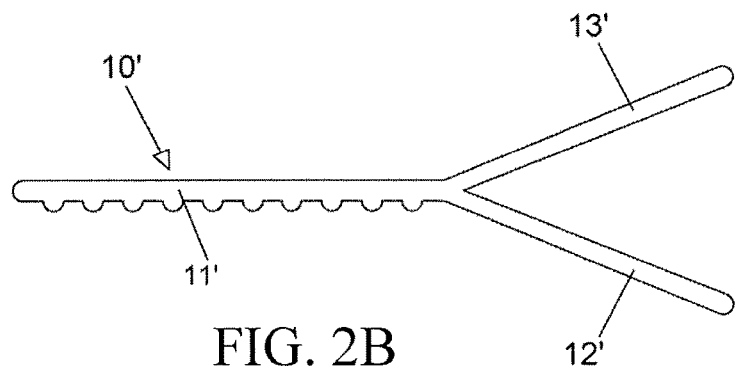
FIG. 2B shows a sectional view of another strip of material according to an exemplary embodiment of the present invention.

FIG. 2A and FIG. 2B show respectively a sectional view (when viewed from the lateral side) of the strip of material of the present invention prior to it being attached to an edge of a garment according to an exemplary embodiment of the present invention. As shown in the figures, the strip of material according to an exemplary embodiment of the present invention has generally a Y-shaped cross section and may also have other specific structure. For example, FIG. 2A shows the strip of material 10 formed by the main body 11, and the first extension 12 and the second extension 13 separately extending from the long edge or side 19 of the main body 11, and FIG. 2B shows the strip of material 10' formed by the main body 11', and the first extension 12' and the second extension 13' separately extending from the long edge or side of the main body 11'. It can be seen that the main body 11 and the main body 11' have different sectional shapes so as to adapt to different applications. It should be appreciated that the sectional shape of the main body is not limited to the shapes shown in FIG. 2A and FIG. 2B and may be of any appropriate shape. Similarly, the sectional shapes of the first extension and the second extension may also be different according to different requirements.

According to an exemplary embodiment, the strip of material according to the present invention may be an elastic material such as rubber or rubber band. In different embodiments, the strip of material according to the present invention may also be made of a non-elastic material.

In different embodiments, at least one of the first extension and the second extension may be integrally formed with the main body, or, alternatively, at least one of the first and second extensions may be a separate piece but is connected to the main body through an appropriate connection means such as welding.

According to an exemplary embodiment, the distal longitudinal edge of the first extension, i.e. the edge that is away from the main body, is suitable for attaching to an edge of the garment, or at least a portion of an edge of the garment. The side of the second extension that is facing the first extension can be coated with an adhesive and is adapted to bond with the first extension and the garment edge. It should be noted that in this description, whenever an edge of a garment is referred to, it includes a portion of the garment edge wherever the context permits. According to an exemplary embodiment, in order to facilitate the bonding between the first extension and the garment edge, the first extension and the garment edge may initially be attached to each other so that their relative position is then fixed. For example, the first extension and the garment edge may be attached to each other by sewing so as to fix their relative position. As a result, a sewing thread may form at the bond between the first extension and the garment edge. It should be appreciated that it is not necessary to fix the relative position of the first extension and the garment edge prior to the connection hereinafter described. In other embodiments, the first extension and the garment edge may not be fixed in relative position prior to the connection.

Figure 4A:
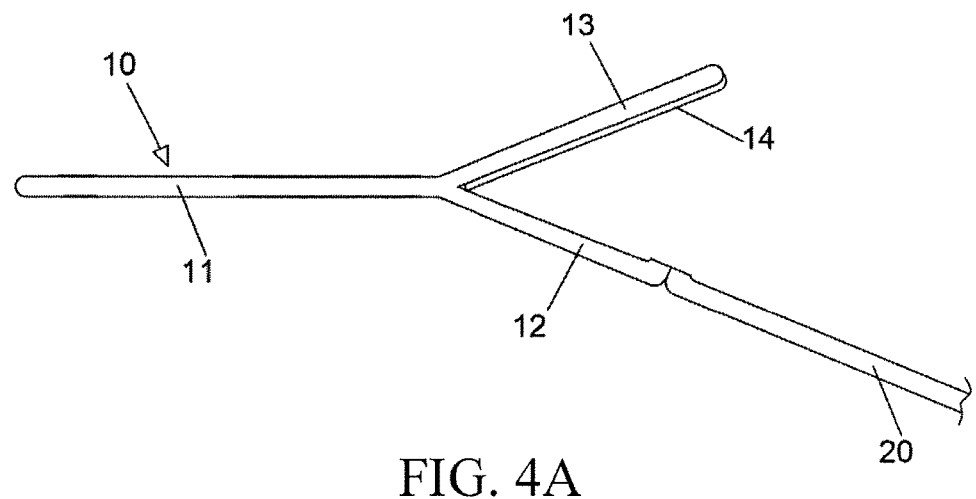
FIG. 4A shows a sectional schematic diagram of the strip of material shown in FIG. 3 ultrasonically welded to the edge of a garment without sewing thread retained, according to an exemplary embodiment of the present invention.
Figure 4B:
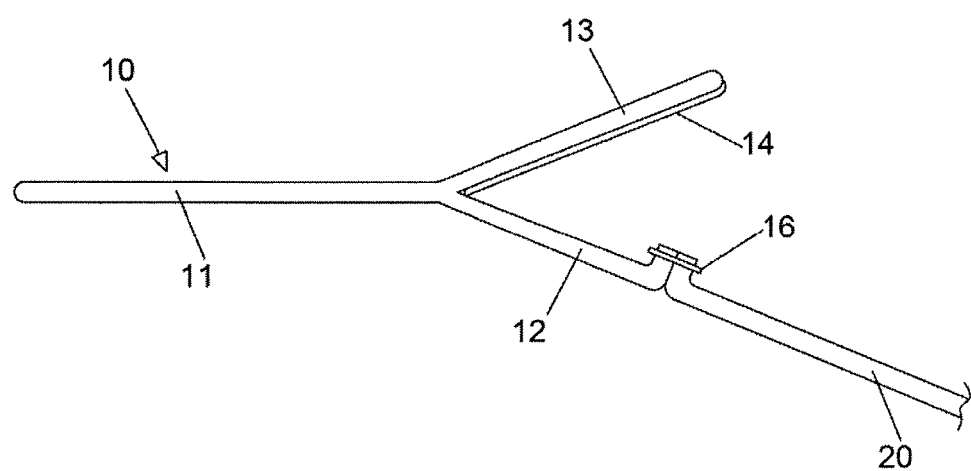
FIG. 4B shows a sectional schematic diagram of the strip of material shown in FIG. 3 ultrasonically welded to the edge of a garment with sewing thread retained, according to an exemplary embodiment of the present invention.
Figure 5A:
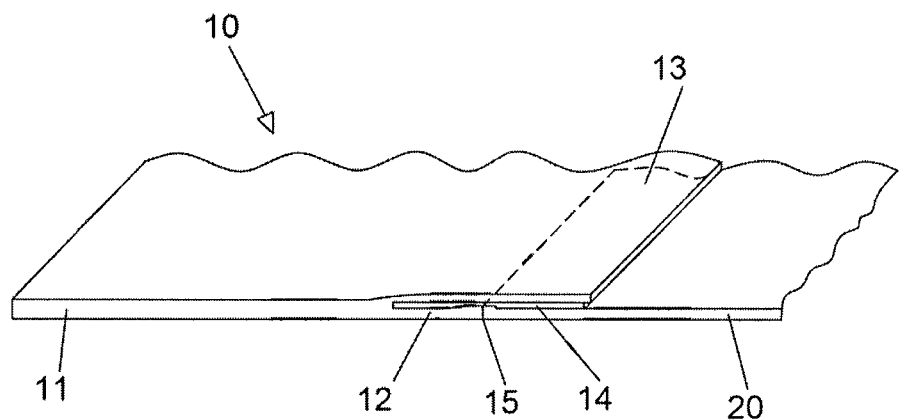
FIG. 5A shows a perspective schematic diagram of a second extension of the strip of material after being bonded with a first extension of the strip of material and the edge of the garment according to an exemplary embodiment of the present invention.
Figure 5B:
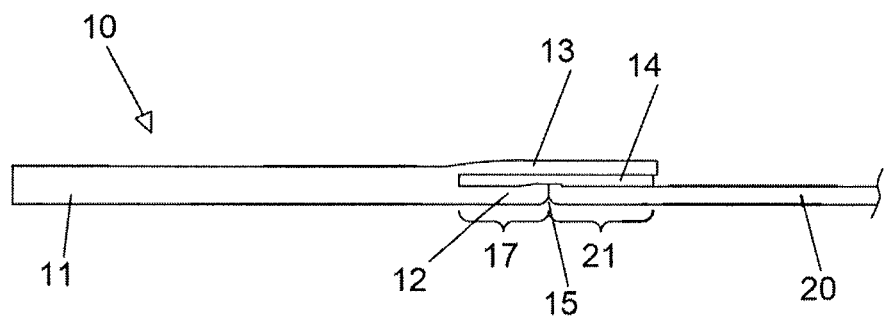
FIG. 5B shows a sectional view of the embodiment shown in FIG. 5A.
Figure 6A:
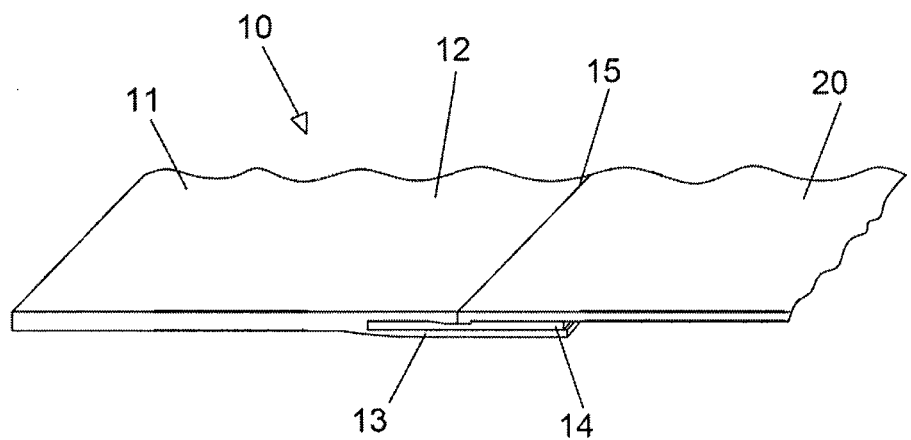
FIG. 6A shows a perspective schematic diagram of a second extension of the strip of material after being bonded with the first extension of the strip of material and the edge of the garment according to another exemplary embodiment of the present invention.
Figure 6B:
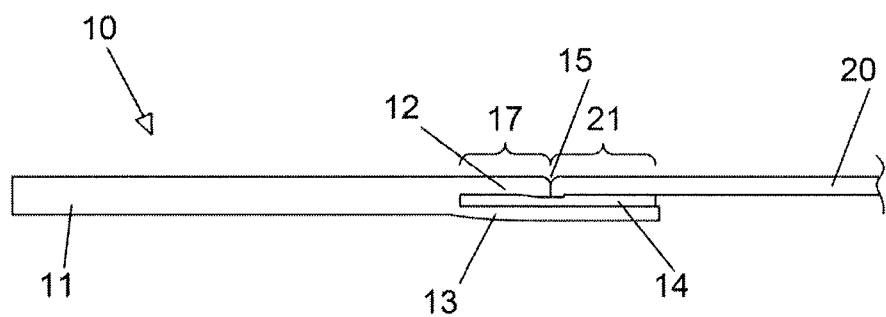
FIG. 6B shows a sectional view of embodiment shown in FIG. 6A.

FIGS. 3 to 5B show a method of attaching the strip 10 to an edge of a garment or to an edge of a garment panel if the garment is formed of multiple panels. FIG. 5A and FIG. 5B show an embodiment where the first extension is on the inner side, i.e. the side that is closer to the wearer's body, while FIG. 6A and FIG. 6B show an alternative embodiment where the first extension is on the outer side, i.e. the side that is further away from the wearer's body. In these figures, the lower side of the figure represents the inner side, while the upper side of the figure represents the outer side.

Figure 3:
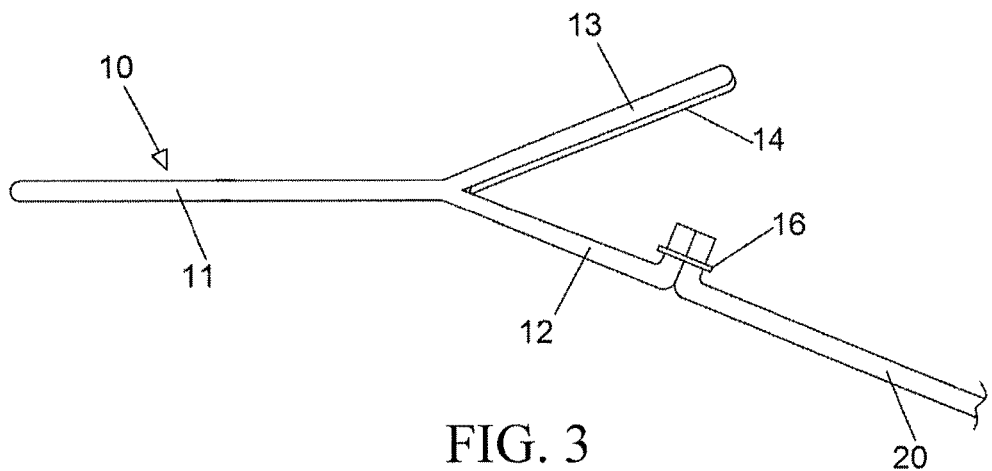
FIG. 3 shows a sectional schematic diagram of the strip of material coated with an adhesive and positioned with an edge of a garment by sewing, according to an exemplary embodiment of the present invention.

FIG. 3 shows a sectional view of the strip of material after the application of an adhesive to the side of the second extension facing the first extension and the fixing of the relative position of the garment edge and the first extension, according to an exemplary embodiment of the present invention. As shown in the figure, an adhesive 14 is applied on the side or surface of the second extension 13 facing the first extension 12. In addition, the first extension 12 and the garment edge 20 are fixed in relative position to each other by sewing, with sewing thread 16 formed at the location where the first extension 12 is attached to the edge of the garment 20. The garment edge may comprise a single layer of material, or may comprise two or more layers of materials.

According to an exemplary embodiment, after the first extension and the garment edge are fixed in relative position to each other, the first extension and the garment edge may further be connected to each other through a non-stitching or seamless means such as welding or ultrasonic welding.

Figure 7A:
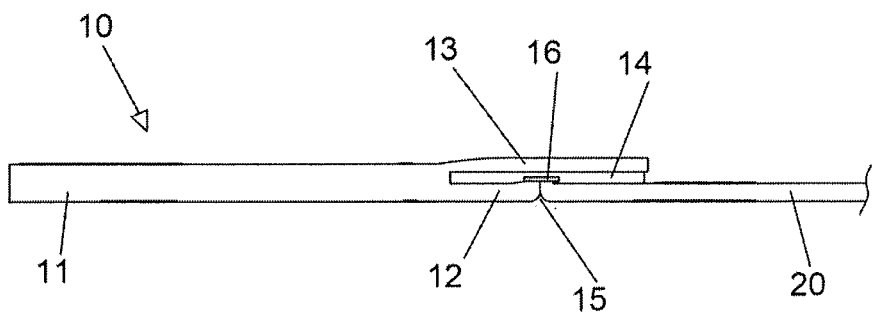
FIG. 7A shows a sectional view of the second extension of the strip of material after being bonded with the first extension of the strip of material and the edge of the garment with sewing thread retained, according to an exemplary embodiment of the present invention.
Figure 7B:
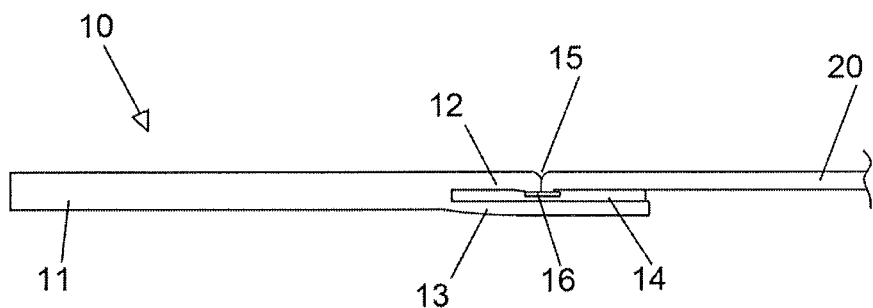
FIG. 7B shows a sectional view of the second extension of the strip of material after being bonded with the first extension of the strip of material and the edge of the garment with sewing thread retained, according to another exemplary embodiment of the present invention.

The most preferred way of connecting is through ultrasonic welding, which involves ultrasonic cutting and welding at the same time. The ultrasonic cutting may be executed between the inner side of the sewing thread 16 (i.e., the side that is closer to the first extension 12 and the garment 20) and the first extension 12 and the garment 20. In this case, the sewing thread 16 is removed after the ultrasonic cutting, as illustrated in FIG. 3 and FIG. 4A. Alternatively, the ultrasonic cutting may also be executed on the outer side of the sewing thread 16 (i.e. the side that is away from the first extension 12 and the garment 20). In this case, the sewing thread 16 will remain after the ultrasonic cutting, as illustrated in FIG. 3 and FIG. 4B. Since the first extension 12 is connected with or further attached to the edge 15 of the garment 20 by a seamless means such as welding, and the second extension 13 covers or overlaps the first extension 12 and an edge region 21 of the garment 20, even if the sewing thread 16 remains after the ultrasonic cutting, after the welding and the covering up by the second extension 13, the sewing thread 16 will not be visible from the outside, as illustrated in FIG. 7A and FIG. 7B.

After the seamless connection, and after the application of adhesive 14 onto the side of the second extension 13 facing the first extension 12, the adhesive 14 may for example be activated by heat and upon the application of pressure, the second extension 13 is bonded to the first extension 12 and the edge region 21 of the garment 20, so that the second extension 13 firmly covers the sewing thread, if present, initially attaching the first extension 12 to the edge 15 of the garment 20 to fix the first extension 12 and the garment edge 15 in relative position to each other. In one embodiment, the adhesive 14 may for example be an adhesive film.

After the first extension 12 has been connected with the garment edge by a seamless means such as welding, any surplus portion may be removed, and the sewing thread 16, if present, may or may not be retained. FIG. 4A shows a sectional schematic diagram of the first extension 12 of the strip of material 10 shown in FIG. 3 having been ultrasonically welded to the edge of the garment 20 without retaining the sewing thread 16, according to an exemplary embodiment of the present invention. FIG. 4B shows a sectional schematic diagram of the first extension 12 of the strip of material 10 shown in FIG. 3 having been ultrasonically welded to the edge of the garment 20 with the sewing thread 16 retained, according to another exemplary embodiment of the present invention.

As mentioned above, since the fixing, for example by means of sewing, of the relative position of the first extension and the garment edge is not a necessary step, in the absence of such step, the first extension may also be connected with the garment edge solely by a seamless means such as welding or ultrasonic welding.

Further, the second extension 13 to which an adhesive or an adhesive film is applied is bonded to the first extension and the garment edge which are mutually connected to each other. According to an exemplary embodiment, the second extension is adapted to overlap or cover the bond between the first extension and the garment edge, for example an ultrasonic bond, so as to prevent the breaking up of the bond. FIG. 5A and FIG. 5B show a perspective schematic diagram and a section view respectively of the second extension 13 of the strip of material 10 having been bonded to the first extension 12 and the edge region 21 of the garment 20, according to an exemplary embodiment of the present invention. As illustrated, the bond between the first extension 12 and the garment edge 15 is covered, or protected, by the second extension 13.

As shown in FIG. 5B, according to an exemplary embodiment, a first portion of the second extension 13 is attached to at least a portion 17 of the first extension 12 by, for example, adhesive 14, and a second portion of the second extension 13 is attached to the edge region 21 of the garment 20 by, for example, adhesive 14. The said first and second portions of the second extension 13 do not overlap each other. Attachment of the second extension 13 to the first extension 12 and the edge region 21 is not necessarily by adhesive, and could be by any other suitable means.

It should be noted that although the embodiment as illustrated in FIG. 5A and FIG. 5B shows that the first extension 12 is disposed on the inner side (i.e. the side closer to the body of a wearer), and the second extension 13 is disposed on the outer side (i.e. the side further away from the body of the wearer). In another embodiment, the first extension 12 may be disposed on the outer side, while the second extension 13 is disposed on the inner side, as for example illustrated in FIG. 6A and FIG. 6B.

It can be seen from FIG. 5A and FIG. 5B, and FIG. 6A and FIG. 6B, that along the direction that is perpendicular to a longitudinal side 18 or 19 of the strip of material 10, i.e. along the horizontal direction in the figures, the first extension 12 is shorter than the second extension 13. This enables the second extension 13 to cover and completely overlap the bond between the first extension 12 and the garment edge 15 so as to protect the bond from breaking up.

FIG. 6A and FIG. 6B show a perspective schematic diagram and a section view respectively of the second extension 13 of the strip of material 10 having been bonded with the first extension 12 and the edge region 21 and covering or overlapping the bond between the first extension 12 and the edge region 21, according to an exemplary embodiment, in which the first extension 12 is disposed on the outer side, while the second extension 13 is disposed on the inner side. In this embodiment, the sewing thread 16 is not retained after the ultrasonic cutting step mentioned above.

FIG. 7A shows a sectional view of the second extension 13 of the strip of material 10 having been bonded to the first extension 12 and the edge region 21 of the garment 20 and covering or overlapping the bond between the first extension 12 and the edge region 21, according to an exemplary embodiment, in which the sewing thread 16 is retained after the ultrasonic cutting step mentioned above. In this embodiment, the first extension 12 is disposed on the inner side while the second extension is disposed on the outer side. FIG. 7B shows another embodiment in which the first extension 12 is disposed on the outer side while the second extension 13 is disposed on the inner side. In both embodiments, as the sewing thread 16 is covered up by the second extension 13, the sewing thread 16 is not exposed and is not visible from the outside.

According to an exemplary embodiment as illustrated in FIG. 2A, prior to the step of ultrasonic cutting, the first extension 12 and the second extension 13 may have approximately the same length along a direction perpendicular to a longitudinal side 18 or 19 of the main body 11. After the ultrasonic cutting step, as illustrated in FIG. 4A and FIG. 4B, the first extension 12 is shorter than the second extension 13 along a direction perpendicular to the longitudinal side 18 or 19 of the main body 11, so that the second extension 13 sufficiently and completely covers and overlaps the seamless or welded joint between the first extension 12 and the garment edge 15 so as to protect the joint.

Figure 8:
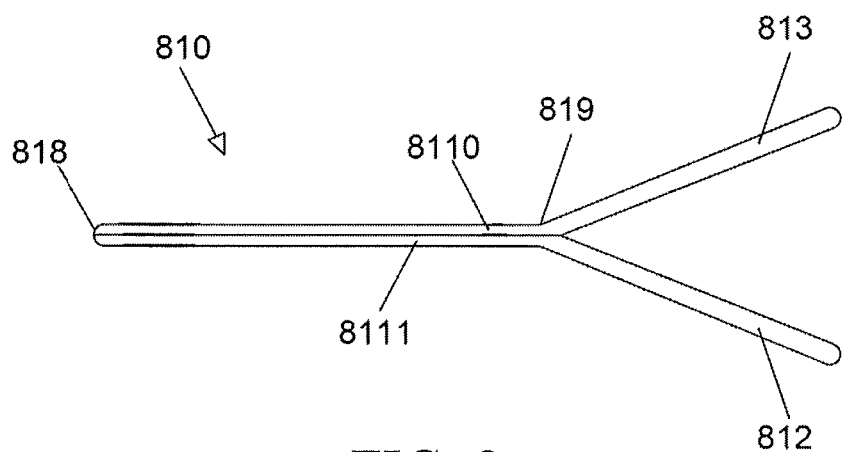
FIG. 8 shows a sectional schematic diagram of the strip of material according to an exemplary embodiment of the present invention.

According to an exemplary embodiment, the strip of material of the present invention may comprise a plurality of material layers. For example, FIG. 8 shows a sectional view of a strip of material 810 according to an exemplary embodiment of the present invention. As shown in FIG. 8, the main body of the strip of material 810 includes two material layers 8110 and 8111 laminated or affixed to each other, and has two opposite longitudinal sides 818 and 819. The first extension 812 and the second extension 813 each extends from the longitudinal edge 819. As shown in FIG. 8, the first extension 812 is integrally formed with the material layer 8111 of the main body to form a one-piece layer, and the second extension 813 is integrally formed with the material layer 8110 of the main body to form another one-piece layer.

Figure 9:
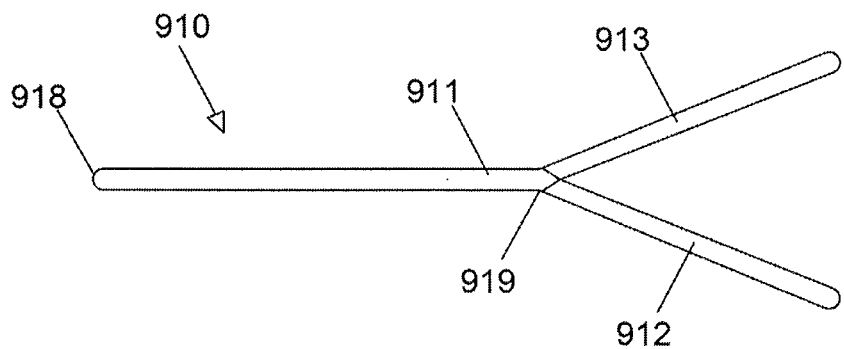
FIG. 9 shows a sectional schematic diagram of the strip of material according to another exemplary embodiment of the present invention.

Alternatively, the first extension and the second extension may not be integrally faulted with the main body but may be connected to the main body through an appropriate connection means. FIG. 9 shows a sectional view of a strip of material 910 of another exemplary embodiment, for which the main body 911 has two opposite longitudinal sides 918 and 919, and the first extension 912 and the second extension 913 are connected to the main body 911 at the longitudinal side 919, thereby forming the extensions from the main body 911. In this case, the main body 911 may comprise a single layer or multiple layers. In case the main body comprises multiple layers, the first extension and the second extension may be respectively connected with one layer or multiple layers of the main body, or may be integrally formed with the main body. In the embodiment as shown in FIG. 9, the main body 911, the first extension 912, and the second extension 913 are three separate strips; the first extension 912 and the second extension 913 are each attached to the main body 911 at the longitudinal side 919.

In embodiments where the first extension and/or the second extension is or are integrally formed with the main body, the above-mentioned longitudinal side or edge of the main body may not be a physical or actual edge, but may merely be a virtual or imaginary edge. With the virtual or imaginary edge, the first extension and the second extension are not independent pieces separate from the main body, although both the first extension and the second extension extend from the edge. For example, in the embodiment of strip 10 as shown in FIG. 1, the main body 11 and the first and second extensions 12, 13 are integrally formed as one unitary piece. In this case, the longitudinal side 19 does not constitute a physical edge, but should be regarded as an "imaginary boundary" of the main body 11 from which the first and second extensions 12, 13 extend. However, in the embodiment of strip 910 as shown in FIG. 9, the longitudinal side 919 does constitute an edge of the main body 911, as the main body 911, the first extension 912, and the second extension 913 are three separate strips joined at the longitudinal side or edge 919 of the main body 911.

Figure 10:
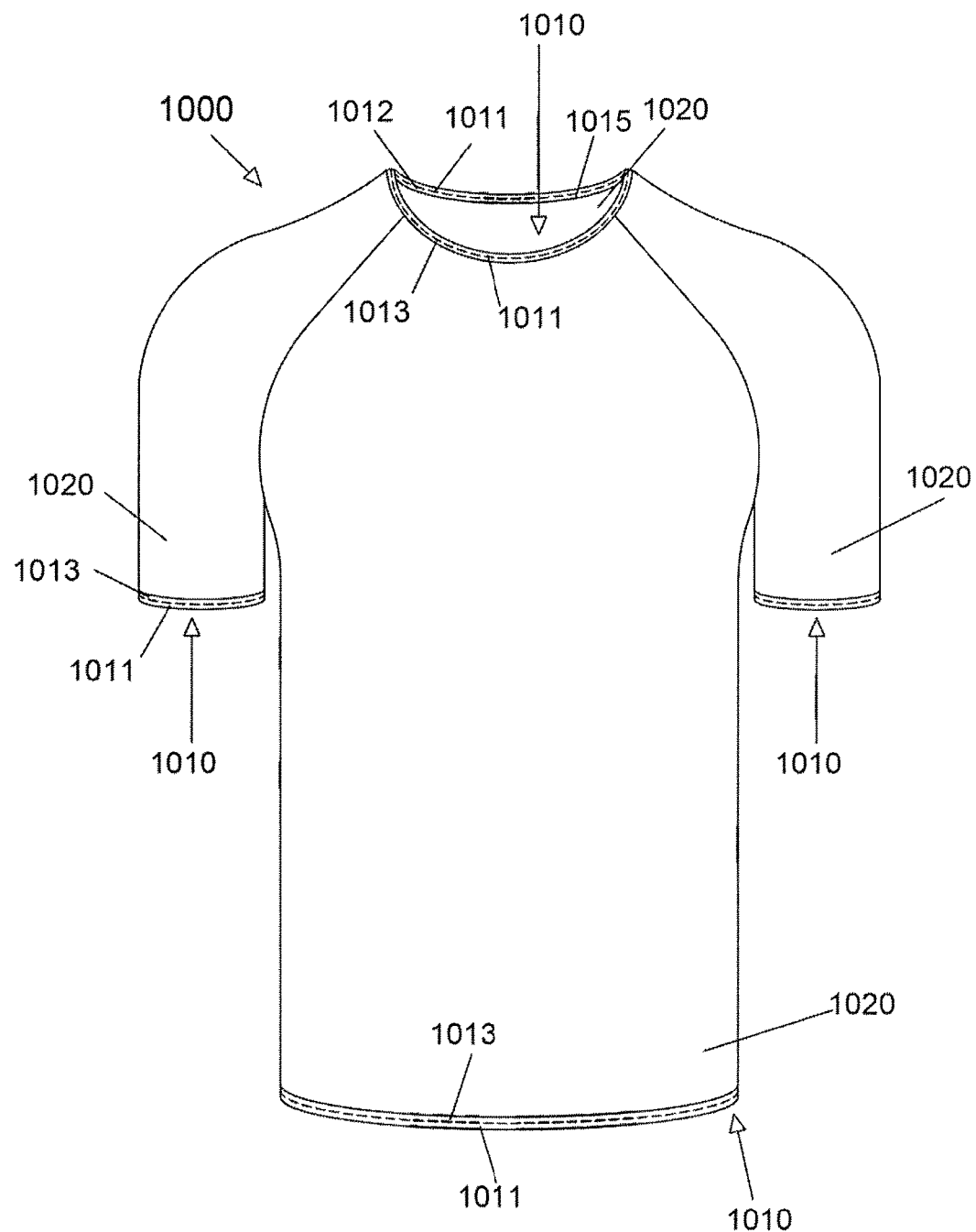
FIG. 10 shows a T-shirt according to an exemplary embodiment of the present invention.

FIG. 10 shows a T-shirt 1000 according to an exemplary embodiment of the present invention. A strip of material 1010 according to an exemplary embodiment of the present invention is employed to protect and cover an edge 1015 of the T-shirt 1000 in an edge region 1020 of the T-shirt 1000, such as a neckline, a sleeve opening, or a bottom opening. In each case, since the edge is circular, the two longitudinal ends of the strip 1010 are joined to each other to form a circular strip for attaching to, and thereby protecting, the T-shirt's edge at the neckline, the sleeve opening, and/or the bottom opening. As shown in the figure, the strip of material 1010 for protecting at least one portion of the edge 1015 of the T-shirt 1000 includes a main body 1011, and a first extension 1012 and a second extension 1013 extending from one of the longitudinal sides of the main body 1011. In the embodiment shown in FIG. 10, the first extension 1012 is arranged on the inner side of the T-shirt 1000, i.e. the side closer to the wearer's body, and the second extension 1013 is arranged on the outer side of the T-shirt 1000, i.e. the side further away from the wearer's body. An alternative arrangement is possible, i.e. the first extension can be on the outer side instead. The first extension 1012 is attached by ultrasonic welding to at least a portion of the edge 1015 of the T-shirt 1000 and does not cover or overlap the at least a portion of the edge 1015 of the T-shirt 1000 at least on the inner side of the T-shirt 1000. The second extension 1013 is attached by adhesive to and covers at least a portion of the first extension 1012, the at least a portion of the edge 1015 of the T-shirt 1000, and the edge region 1020 or the region proximal at least a portion of the edge 1015 of the T-shirt 1000.

Figure 11:
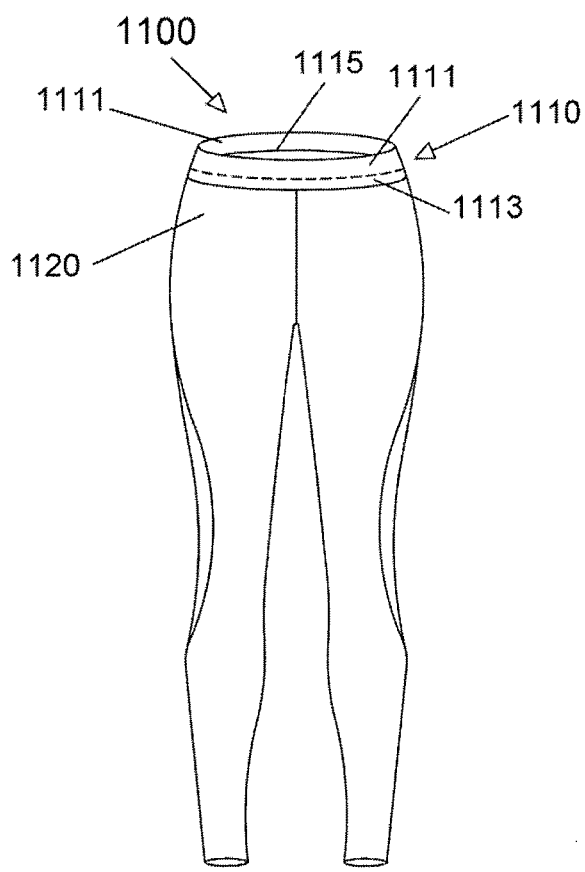
FIG. 11 shows pants according to an exemplary embodiment of the present invention.

FIG. 11 shows pants 1100 according to an exemplary embodiment of the present invention. A strip of material 1110 according to an exemplary embodiment of the present invention is employed to protect and cover an edge 1115 of the pants 1100 in an edge region 1120 of the pants 1100, such as the waist of the pants. As shown in the figure, the strip of material 1110 for protecting at least a portion of the edge 1115 of the pants 1100 includes a main body 1111, and a first extension (not shown) and a second extension 1113 extending from one of the longitudinal sides of the main body 1111. In the embodiment shown in FIG. 11, the first extension is arranged on the inner side of the pants 1100, i.e. the side closer to the wearer's body, and the second extension 1113 is arranged on the outer side of the pants 1100, i.e. the side further away from the wearer's body. An alternative arrangement is possible, i.e. the first extension can be on the outer side instead. The first extension is attached by ultrasonic welding to at least a portion of the edge 1115 of the pants 1100 but does not cover or overlap the at least a portion of the edge 1115 of the pants 1100 at least on the inner side of the pants 1100. The second extension 1113 is attached by adhesive to and covers at least a portion of the first extension, the at least a portion of the edge 1115 of the pants 1100, and the edge region 1120 or the region proximal the at least a portion of the edge 1115 of the pants 1100. While not shown in the figure, a strip of material according to the present invention may also be used to protect and cover the edge of a pant leg's bottom opening.

Figure 12:
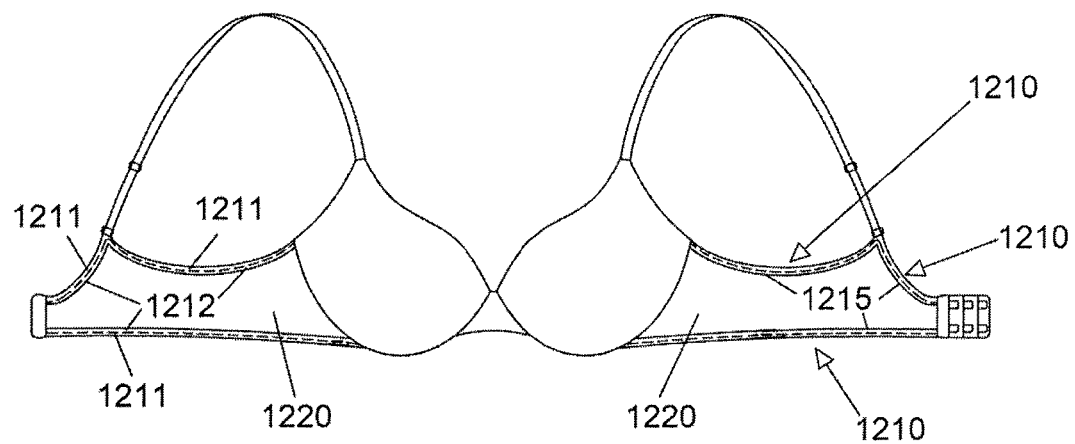
FIG. 12 shows a brassiere according to an exemplary embodiment of the present invention.

FIG. 12 shows a brassiere 1200 according to an exemplary embodiment of the present invention. A strip of material 1210 according to an exemplary embodiment of the present invention is employed to protect and cover an edge 1215 of the brassiere 1200 in an edge region 1220 of the brassiere 1200, such as an upper edge, a lower edge, or a side edge of a side wing. As shown in the figure, the strip of material 1210 for protecting at least a portion of the edge 1215 of the brassiere 1200 includes a main body 1211, and a first extension 1212 and a second extension (not shown) extending from one of the longitudinal sides of the main body 1211. In the embodiment shown in FIG. 12, the first extension 1212 is arranged on the inner side of the brassiere 1200, i.e. the side closer to the wearer's body, and the second extension is arranged on the outer side of the brassiere 1200, i.e. the side further away from the wearer's body. An alternative arrangement is possible, i.e. the first extension can be on the outer side instead. The first extension 1212 is attached by ultrasonic welding to at least a portion of the edge 1215 of the brassiere 1200 and does not cover or overlap the at least a portion of the edge 1215 of the brassiere 1200 at least on the inner side of the brassiere 1200. The second extension is attached by adhesive to and covers at least a portion of the first extension 1212, the at least a portion of the edge 1215 of the brassiere 1200, and the edge region 1220 or the region proximal the at least a portion of the edge 1215 of the brassiere 1200.

Figure 13:
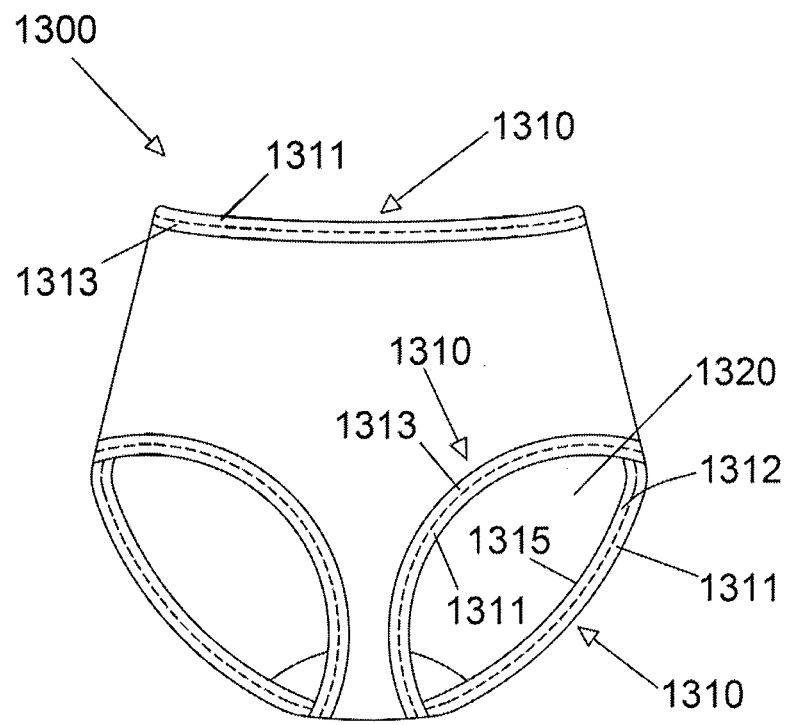
FIG. 13 shows underpants according to an exemplary embodiment of the present invention.

FIG. 13 shows underpants 1300 according to an exemplary embodiment of the present invention. A strip of material 1310 according to an exemplary embodiment of the present invention is employed to protect and cover an edge 1315 of the underpants 1300 in an edge region 1320 of the underpants 1300, such as the waist or thigh end of the underpants 1300. As shown in the figure, the strip of material 1310 for protecting at least a portion of the edge 1315 of the underpants 1300 includes a main body 1311, and a first extension 1312 and a second extension 1313 extending from one of the longitudinal sides of the main body 1311. In the embodiment shown in FIG. 13, the first extension 1312 is arranged on the inner side of the underpants 1300, i.e. the side closet to the wearer's body, and the second extension 1313 is arranged on the outer side of the underpants 1300, i.e. the side further away from the wearer's body. An alternative arrangement is possible, i.e. the first extension can be on the outer side instead. The first extension 1312 is attached by ultrasonic welding to at least a portion of the edge 1315 of the underpants 1300 and does not cover or overlap the at least a portion of the edge 1315 of the underpants 1300 at least on the inner side of the underpants 1300. The second extension 1313 is attached by adhesive to and covers at least a portion of the first extension 1312, the at least a portion of the edge 1315 of the underpants 1300, and the edge region 1320 or the region proximal the at least a portion of the edge 1315 of the underpants 1300.

Figure 14:
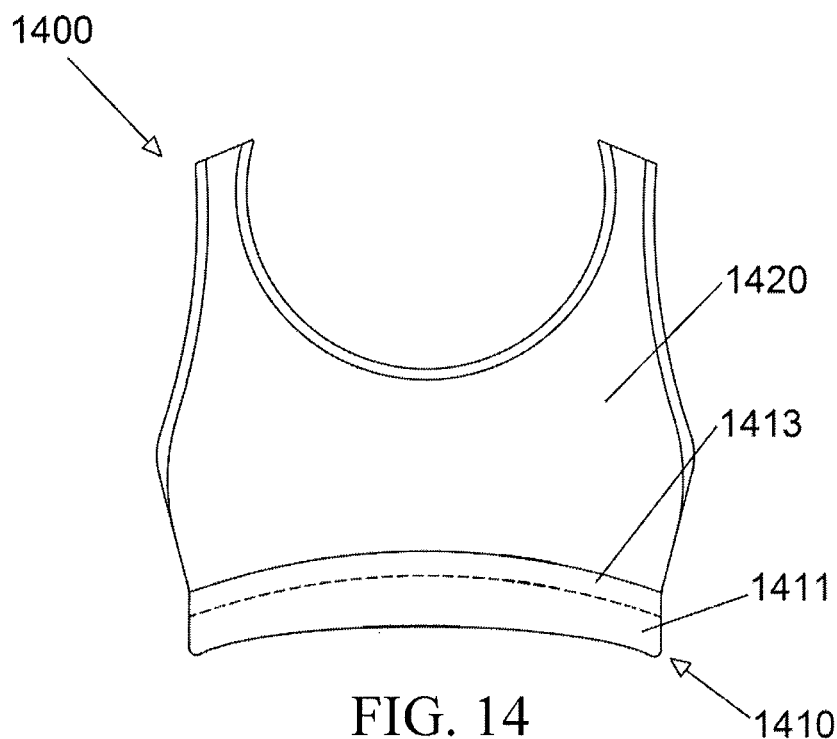
FIG. 14 shows a sports top according to an exemplary embodiment of the present invention.

FIG. 14 shows a sportswear or sports top 1400 according to an exemplary embodiment of the present invention. A strip of material 1410 according to an exemplary embodiment of the present invention is employed to protect and cover an edge of a sportswear or sports top 1400 in an edge region 1420 of the sports top 1400, such as the lower hem. As shown in the figure, the strip of material 1410 for protecting at least a portion of the edge of the sports top 1400 includes a main body 1411, and a first extension (not shown) and a second extension 1413 extending from one of the longitudinal sides of the main body 1411. In the embodiment shown in FIG. 14, the first extension is arranged on the inner side of the sports top 1400, i.e. the side closer to the wearer's body, and the second extension 1413 is arranged on the outer side of the sports top 1400, i.e. the side further away from the wearer's body. An alternative arrangement is possible, i.e. the first extension can be on the outer side instead. The first extension is attached by ultrasonic welding to at least a portion of the edge of the sports top 1400 and does not cover or overlap the at least a portion of the edge of the sports top 1400 at least on the inner side of the sports top 1400. The second extension 1413 is attached by adhesive to and covers at least a portion of the first extension 1312, the at least a portion of the edge of the sports top 1400, and the edge region 1420 or the region proximal the at least a portion of the edge of the sports top 1400.

It should be appreciated that any technical feature and combinations thereof described with respect to FIG. 1 to FIG. 9 are applicable to the applications described in FIG. 10 to FIG. 14 in the absence of a conflict. Additionally, although FIG. 10 to FIG. 14 and corresponding descriptions thereof illustrate and describe the first extension as being arranged on the inner side, it should be appreciated that the first extension may also be arranged on the outer side. The same is similarly true for the second extension.

The strip of material according to the present invention is used for protecting and covering the edge of a garment, so that not only can the garment have a smooth, clean and thin appearance, but also the friction to the human body is reduced, thereby improving comfort. Where an elastic material is used, the strip of material also has good elasticity and high resilience.

The foregoing description refers to preferred embodiments of the present invention and the technical principles of the present invention. It should be appreciated by those skilled in the art that the scope of the invention recited in the present invention is not limited to the technical solution formed by particularly combining the above technical features and should also be covered by other technical solutions formed by arbitrarily combining the above technical features or equivalent features thereof without departing from the inventive concept.

The invention claimed is:

1. A strip of material for protecting an edge of a garment, comprising:
    a main body having two opposite longitudinal sides;
    a first extension extending from one of the longitudinal sides of the main body; and
    a second extension extending from the one of the longitudinal sides of the main body, the first extension and the second extension each being a strip that is parallel with the one of the longitudinal sides of the main body, the first extension having a first side facing the second extension and a second side opposite the first side,
    wherein the first extension is adapted to attach to at least a portion of said edge of the garment, the attachment being such that at least on the second side, the first extension does not overlap the at least a portion of said edge of the garment, and the second extension is adapted to overlap at least a portion of the first side of the first extension, the at least a portion of said edge of the garment, and a region of the garment proximal at least a portion of said edge of the garment.

2. The strip of material as claimed in claim 1, wherein a first portion of the second extension is adapted to attach to the at least a portion of the first side of the first extension, and a second portion of the second extension is adapted to attach to said region of the garment proximal at least said portion of said edge of the garment.

3. The strip of material as claimed in claim 2, wherein the second extension is adapted to attach to the at least a portion of the first side of the first extension and said region of the garment proximal at least said portion of said edge of the garment by means of an adhesive.

4. The strip of material as claimed in claim 1, wherein at least on the second side of the first extension, the at least a portion of said edge of the garment abuts and does not overlap an edge of the first extension.

5. The strip of material as claimed in claim 1, wherein the first extension is adapted to attach to the at least a portion of said edge of the garment by non-stitching means.

6. The strip of material as claimed in claim 5, wherein the first extension is adapted to further attach to the at least a portion of said edge of the garment by stitching.

7. The strip of material as claimed in claim 1, wherein the strip of material is elastic.

8. The strip of material as claimed in claim 7, wherein the strip of material comprises rubber.

9. The strip of material as claimed in claim 1, wherein at least one of the first and second extensions is attached to the one of the longitudinal sides of the main body.

10. The strip of material as claimed in claim 1, wherein at least one of the first and second extensions is integrally formed with the main body.

11. The strip of material as claimed in claim 1, wherein the main body comprises a plurality of layers of material.

12. The strip of material as claimed in claim 11, wherein the first extension extends from a first layer of material of the main body, and the second extension extends from a second layer of material of the main body.

13. The strip of material as claimed in claim 1, wherein along a direction perpendicular to the one of the longitudinal sides of the main body, the first extension is shorter than the second extension.

14. The strip of material as claimed in claim 1, wherein the garment is one of the following: brassiere, T-shirt, pants, underpants, and sports top.

15. A method for protecting an edge of a garment, comprising the steps of:
    attaching a first extension of a strip of material to at least a portion of said edge of the garment, wherein the strip of material comprises a main body having two opposite longitudinal sides, and a first extension and a second extension extending from one of the longitudinal sides, the first extension and the second extension each being a strip of material parallel with said one of the longitudinal sides, the first extension having a first side facing the second extension and a second side opposite the first side, wherein the first extension is attached to the at least a portion of said edge of the garment, and, at least on the second side, the first extension does not overlap the at least a portion of said edge of the garment; and attaching a first portion of the second extension to at least a portion of the first side of the first extension, and attaching a second portion of the second extension to a region of the garment proximal at least a portion of said edge of the garment, such that the second extension overlaps the at least a portion of the first side of the first extension, the at least a portion of said edge of the garment, and said region of the garment proximal at least said portion of said edge of the garment.

16. The method as claimed in claim 15, wherein the first extension is attached to the at least a portion of said edge of the garment by non-stitching means.

17. The method as claimed in claim 15, further comprising the step of:
attaching the first extension to the at least a portion of said edge of the garment by stitching prior to the step of attaching the first extension to the at least a portion of said edge of the garment by non-stitching means.

18. The method as claimed in claim 15, wherein at least on the second side of the first extension, the at least a portion of said edge of the garment abuts and does not overlap an edge of the first extension.

19. The method as claimed in claim 15, wherein the strip of material is elastic.

20. The method as claimed in claim 15, wherein at least one of the first and second extensions is integrally formed with the main body.

21. The method as claimed in claim 15, wherein at least one of the first and second extensions is attached to the one of the longitudinal sides of the main body.

22. The method as claimed in claim 15, wherein along a direction perpendicular to the one of the longitudinal sides of the main body, the first extension is shorter than the second extension.

* * * * *